United States Patent
Setogawa (10) Patent No.: US 6,400,643 B1
(45) Date of Patent: Jun. 4, 2002

(54) SEMICONDUCTOR STORAGE DEVICE WITH SUPPRESSED POWER CONSUMPTION AND REDUCED RECOVERY TIME FROM SUSPEND MODE

(75) Inventor: Jun Setogawa, Hyogo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/796,537

(22) Filed: Mar. 2, 2001

(30) Foreign Application Priority Data

Sep. 8, 2000 (JP) ......................................... 2000-273412

(51) Int. Cl.$^7$ ................................................ G11C 8/00
(52) U.S. Cl. .................... 365/233; 365/194; 365/189.07
(58) Field of Search ........................... 365/233, 189.07, 365/194, 230.08, 230.06, 230.01

(56) References Cited

U.S. PATENT DOCUMENTS

| 5,629,897 A | 5/1997 | Iwamoto et al. |
| 5,708,611 A | 1/1998 | Iwamoto et al. |
| 6,215,726 B1 * | 4/2001 | Kubo .......................... 365/233 |

* cited by examiner

Primary Examiner—David Nelms
Assistant Examiner—David Lam
(74) Attorney, Agent, or Firm—McDermott, Will & Emery (57) ABSTRACT

An internal clock signal generating circuit includes a phase comparing circuit which is made active in accordance with a control signal SEN which becomes intermittently active in a power down mode from an operation permission signal generating circuit, receives an external clock signal and an output from a delay circuit, and compares phases of the signal and the output with each other, an address generating circuit for receiving a phase comparison result and generating a delay amount control signal for controlling a delay amount, and an address decoder for receiving an output of the delay circuit and generating a decode signal for controlling the delay amount.

9 Claims, 10 Drawing Sheets

U0–U15 : UNIT DELAY ELEMENTS
TA : FIRST INPUT TERMINAL
TB : SECOND INPUT TERMINAL
TC : OUTPUT TERMINAL

SEMICONDUCTOR STORAGE DEVICE WITH SUPPRESSED POWER CONSUMPTION AND REDUCED RECOVERY TIME FROM SUSPEND MODE

BACKGROUND OF THE INVENTION

1. Field of the Invention

The present invention relates to a semiconductor storage device and, more particularly, a semiconductor storage device which operates synchronously with an external clock signal.

2. Description of the Background Art

In association with increase in operating speed of a microprocessor (hereinbelow, called an MPU) of recent years, to realize high-speed access of a dynamic random access memory (hereinbelow, called a DRAM) or the like used as a main storage device, a synchronous DRAM (hereinbelow, referred to as an SDRAM) or the like which operates synchronously with a clock signal is used.

In an earlier DRAM which does not yet have such a configuration that it operates synchronously with a clock signal, data is outputted from the DRAM within predetermined time (access time) since a timing clock received from the outside.

An SDRAM or the like which operates synchronously with a clock signal has a feature such that, even when its operation becomes faster and a data window of data outputted from a semiconductor storage device becomes narrow, data is received from the outside synchronously with a rising edge of a clock, so that a data read error hardly occurs.

Depending on a system to which a semiconductor storage device is used, however, the semiconductor storage device is requested to operate at a higher speed.

In order to address such a request of increase in processing speed, for example, what is called a double data rate SDRAM (hereinbelow, called a DDR-SDRAM) of providing a timing of data output by using not only a rising edge of a clock but also a trailing edge has been realized.

To realize an operation of such an SRAM, DDR-SDRAM, or the like, a delay locked loop circuit (hereinbelow, referred to as a DLL circuit) is used for generating an internal clock signal synchronized with the external clock signal.

When the DLL circuit is used, however, a problem such that power consumption in a power down mode and the like increases arises.

Figure 12:
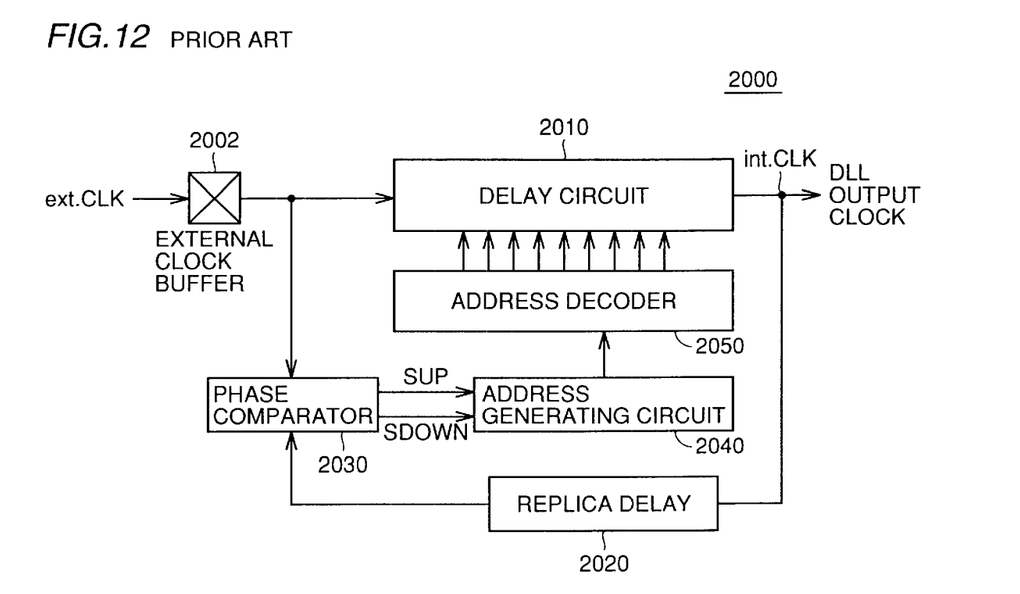
FIG. 12 is a schematic block diagram for explaining the configuration of a conventional DLL circuit 2000.

FIG. 12 is a schematic block diagram for explaining the configuration of such a conventional DLL circuit 2000.

The DLL circuit 2000 has an external clock buffer 2002 for receiving and buffering an external clock signal ext.CLK supplied from the outside, a delay circuit 2010 for receiving an output from the external clock buffer 2002, delaying the output by delay time variably changed and set, and outputting the delayed signal as an internal clock signal int.CLK, a replica delay circuit 2020 for receiving the output of the delay circuit 2010 and delaying the output by predetermined time for adjusting the phase of the internal clock signal int.CLK, a phase comparator 2030 for receiving the output of the external clock buffer 2002 and the output of the replica delay circuit 2020, comparing the phases of the outputs with each other, and outputting a control signal SUP or SDOWN in accordance with the result of comparison, an address generating circuit 2040 for generating a control signal for controlling a delay amount of the delay circuit 2010 so that the phase of the output from the replica delay circuit 2020 and that from the external clock buffer 2002 synchronize with each other in accordance with the signal SUP or SDOWN from the phase comparator 2030, and an address decoder 2050 for receiving an output from the address generating circuit 2040 and outputting a decode signal for controlling the delay amount of the delay circuit 2010.

The replica delay circuit 2020 has, for example, a configuration similar to that of the external clock buffer 2002. With such a configuration, the external clock signal ext.CLK is passed through the external clock buffer 2002 and, after that, supplied to the phase comparator 2030. The internal clock signal int.CLK outputted from the delay circuit 2010 is passed through the replica delay circuit 2020 and then applied to the phase comparator 2030. When the phase comparator 2030 compares the phases of the signals and controls the delay amount of the delay circuit 2010 on the basis of a phase difference so as to eliminate the phase difference, synchronization between the external clock signal ext.CLK and the internal clock signal int.CLK can be basically achieved.

In practice, the internal clock signal int.CLK is outputted from the delay circuit 2010 and is supplied to a buffer circuit for receiving an external control signal and an external address signal, or the like. In this case, when an amplification level of the external clock signal ext.CLK, the ratio of an active period of the clock signal to its cycle, or the like is different from a corresponding amount of the internal clock signal int.CLK, to adjust the difference, the replica delay circuit 2020 may have a delay amount different from that of the external clock buffer 2002 only by an amount of the adjustment.

In an SDRAM having the DLL circuit as shown in FIG. 12, the DLL circuit 2000 operates also in a power down mode (period in which a signal CKE is at an inactive level ("L" level)) of the SDRAM for the following reason.

When the operation of the DLL circuit 2000 is once stopped, after recovery from the power down mode to a normal mode, it takes, for example, about 200 cycles for the delay circuit 2010 in the DLL circuit 2000 to recover to a state where the delay circuit 2010 can make the phase of the external clock signal ext.CLK and that of the internal clock signal int.CLK synchronize with each other. Consequently, a data reading operation or the like cannot be performed immediately after recovery to the normal mode.

In order to deal with such a problem, it is also possible to hold the value of a decode signal supplied to the delay circuit 2010 in the DLL circuit 2000 just before the SDRAM enters the power down mode and, when the SDRAM recovers to the normal mode, to start the operation by using the value of the decode signal as an initial value.

In such a configuration, however, when a delay characteristic of the delay circuit 2010 changes due to a temperature change, voltage change, or the like during the DLL circuit 2000 is suspended, the held delay information becomes useless.

As a result, considerable time is necessary for the delay circuit 2010 in the DLL circuit 2000 to recover to a state where the delay circuit 2010 can synchronize the phases.

In this case, the required time for recovery depends on the degree of the temperature change, voltage change, or the like which occurs during the power down mode, so that it cannot be specified in advance. In order to assure that the data reading operation or the like can be performed immediately after the SDRAM is recovered from the power down mode to the normal mode, therefore, the DLL circuit has to be operated also during the power down mode.

As a result, inherently, in spite of the power down mode for the SDRAM, power is additionally consumed.

SUMMARY OF THE INVENTION

An object of the invention is to provide a semiconductor storage device with suppressed power consumption also in a power down mode.

According to the invention, there is provided a semiconductor storage device which performs a synchronous operation on the basis of an external clock signal, having a storage circuit, a clock control signal generating circuit, and an internal clock signal generating circuit.

The storage circuit holds storage data. The clock control signal generating circuit generates an internal control signal which is intermittently active in a suspension mode in which data transmitting/receiving operations between the storage circuit and the outside of the semiconductor storage device are suspended according to a control signal from the outside, and which is active in a normal mode. The internal clock signal generating circuit is made active by the internal control signal, receives the external clock signal, and generates an internal clock signal for controlling data transmitting/receiving operations to/from the storage circuit.

Therefore, an advantage of the invention is that power consumption in the suspend period is reduced and the internal clock signal generating circuit can generate a desired internal clock signal in short period of time after recovery from the suspension period to normal operation. A data reading operation and the like can be performed in short period of time after recovery from the suspension period to normal operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
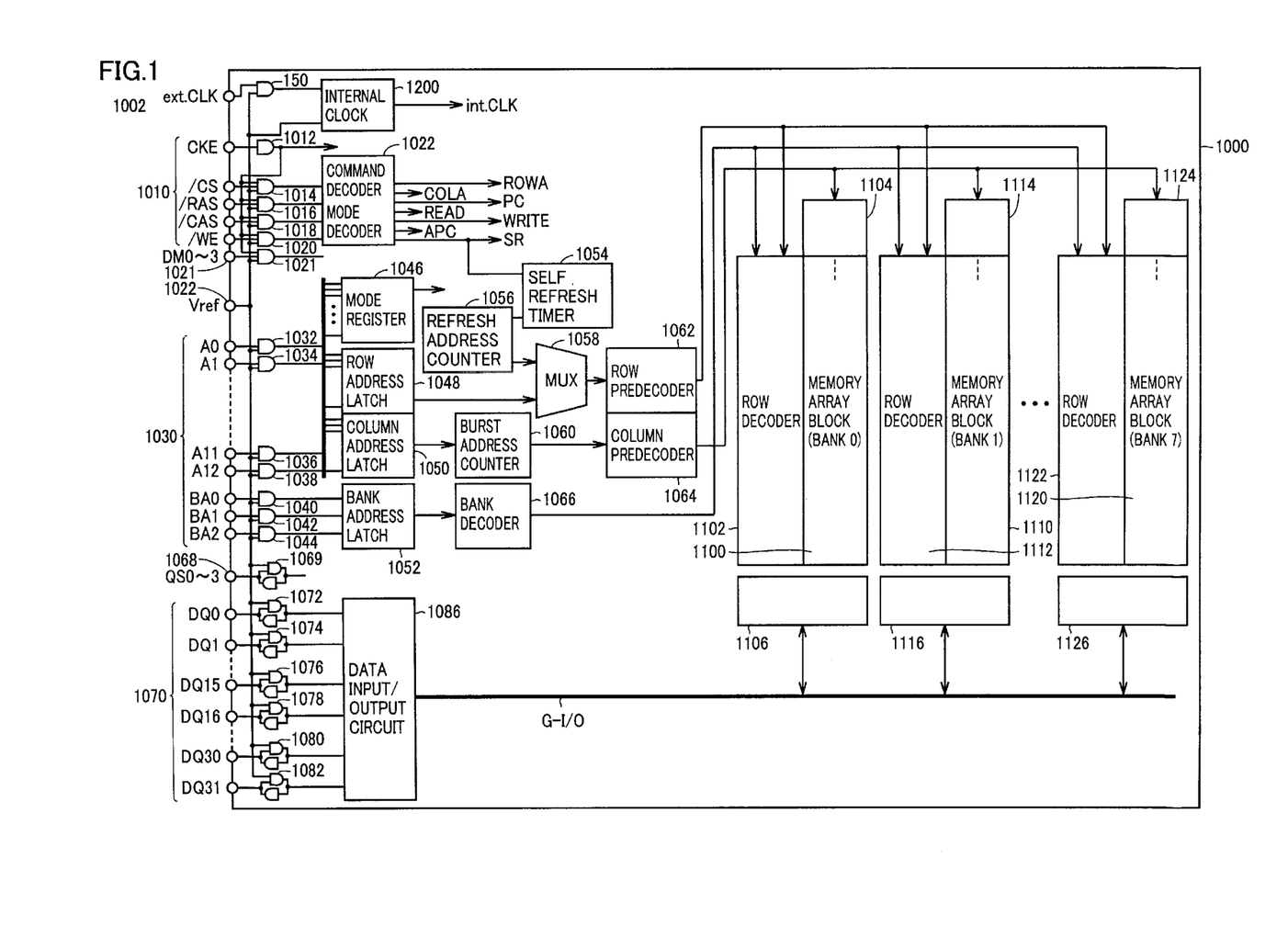
FIG. 1 is a schematic block diagram showing the configuration of a semiconductor storage device 1000 in a first embodiment of the invention.

FIG. 1 is a schematic block diagram showing the configuration of a semiconductor storage device 1000 of a first embodiment of the invention.

In the following, an SDRAM will be described as an example of the semiconductor storage device 1000. However, the invention is not limited to such a case but can be generally applied to a semiconductor storage device which generates an internal clock signal and operates synchronously with an external clock signal.

Referring to FIG. 1, the SDRAM 1000 has an external clock signal input terminal 1002 for receiving a clock signal ext.CLK supplied from the outside, a clock input buffer 150 for buffering the clock signal supplied to the external clock signal input terminal 1002, an internal clock signal generating circuit 1200 for receiving an output of the clock buffer 150 and generating the internal clock signal int.CLK, and a mode decoder 1022 for receiving an external control signal supplied via an external control signal input terminal 1010 via input buffers 1012 to 1020 which operate in accordance with the internal clock signal int.CLK.

To an internal control signal input terminal 1010, a clock enable signal CKE, a chip select signal /CS, a row address strobe signal /RAS, a column address strobe signal/CAS, a write control signal /WE, and data mask signals DM0 to DM3 are supplied.

The signal CKE is a signal to control the operation of the internal clock. This signal instructs entry of a control signal and the like to a chip. In a state where the signal is inactive, the entry of the control signal is not permitted, so that the chip does not operate.

During the signal CKE is at an inactive level ("L" level), the operation mode of the SDRAM 1000 is called a "power down mode". The "power down mode" period includes a period in which a self refresh operation which will be described hereinlater is performed and a period of a standby mode.

The signal/CS is a signal for discriminating whether a command signal is inputted or not. In a state where the signal /CS is active ("L" level), the discrimination of the command is performed in accordance with a combination of levels of other control signals at the rising edge of a clock signal.

The signal/RAS is a signal for instructing the operation of a circuit in the row system, and the signal/CAS is a signal for instructing activation of the operation of a circuit in the column system. The signal/WE is a signal for determining whether an operation to be performed is a writing operation or a reading operation.

The signals DM0 to DM3 are signals for instructing an operation of masking data transmission/reception to/from data input terminals DQ0 to DQ7, DQ8 to DQ15, DQ16 to DQ23, and DQ24 to DQ31, respectively.

The mode decoder 1022 outputs an internal control signal for controlling the operations of internal circuits of the SDRAM 1000 in accordance with the external control signals. The mode decoder 1022 outputs, for example, as internal control signals, signals ROWA, COLA, ACT, PC, READ, WRITE, APC, and SR. The signal ROWA is a signal indicative of access to a row, the signal COLA is a signal indicative of access to a column, and the signal ACT is a signal instructing activation of a word line.

The signal PC is a signal for instructing a precharging operation and instructing ending of a circuit operation of the row system. The signal READ is a signal for instructing a reading operation to a circuit of the row system, and the signal WRITE is a signal for instructing a writing operation to a circuit of the column system.

The signal APC is a signal for instructing an automatic precharging operation. When the automatic precharging operation is designated, at the end of a burst cycle, the precharging operation is automatically started. The signal SR is a signal for instructing a self refresh operation. When the self refresh operation is started, a self refresh timer operates. After elapse of predetermined time, a word line is activated to start the refresh operation.

The SDRAM 1000 further includes: a self refresh timer 1054 which starts operating when the self refresh mode is designated by the signal SR and, after elapse of predetermined time, which instructs activation of a word line, that is, start of a refresh operation; and a refresh counter 1056 for generating an address in which an refresh operation is performed in accordance with the instruction from the self refresh timer 1054.

The SDRAM 1000 further includes: a reference potential input terminal 1022 for receiving a signal VREF as a reference of determining whether the level of an input signal is the "H" level or "L" level; a mode register 1046 for holding, in accordance with a combination of the address signals supplied via the address signal input terminal 1030 and the above-described external control signal, information regarding a predetermined operation mode, data such as burst length, and the like; a row address latch 1048 for receiving an address signal via address signal input buffers 1032 to 1038 which operate according to the internal clock signal int.CLK and latching the supplied row address at a timing the row address is entered; a column address latch 1050 for receiving address signals A0 to Ai and latching a column address at the timing when the column address is entered; a multiplexer 1058 for receiving an output from a refresh address counter 1056 and an output from the row. address latch 1048, and selectively outputting the output from the row address latch 1048 in the normal mode and outputting the output from the refresh address counter 1056 in the self refresh mode; a row predecoder 1062 for receiving an output from the multiplexer 1058 and predecoding the row address; a burst address counter 1060 for generating an internal column address in accordance with data of burst length from the mode register 1046 by using the column address held in the column address latch 1050 as a reference; a column predecoder 1064 for receiving an output of the burst address counter 1060 and predecoding the corresponding column address; a bank address latch 1052 for receiving bank addresses BA0 to BA2 supplied to the address input terminal via input buffers 1040 to 1044 which operate in accordance with the internal clock signal int.CLK and latching a designated bank address value; and a bank decoder 1066 for receiving an output of the bank address latch 1052 and decoding the bank address.

At the time of writing the operation mode information to the mode register, the address signal supplied to the address signal input terminal 1030 is used to write data into the mode register in accordance with the combination of some of the bits of the address signal. For example, values such as burst length BL and CAS latency CL, and an intermittent operation period of the internal clock signal generating circuit 1200 which will be described hereinlater, and the like are designated by a combination of predetermined bits in the address signal.

The bank address signals BA0 to BA2 indicate an access bank at the time of accessing a row and an access bank at the time of accessing a column. Specifically, at each of the access to a row and the access to a column, the bank address signals BA0 to BA2 supplied to the address signal input terminal 1030 are latched by the bank address latch 1052 and, after that, decoded by the bank decoder 1066. The decoded signal is transmitted to each of memory array blocks (banks).

The SDRAM 1000 further includes: memory array blocks 1100, 1110, and 1120 which operate as banks 0 to 7 each of which is a unit capable of independently performing reading/writing operations; row decoders 1102, 1112, and 1122 for selecting a row (word line) in a corresponding bank in accordance with an output from the bank decoder 1066 and an output from the row predecoder 1062; column decoders 1104, 1114, and 1124 for selecting a column (bit line pair) in a corresponding bank in accordance with an output from the column predecoder 1064; I/O ports 1106, 1116, and 1126 for, in a reading operation, supplying data read from the selected memory cell in the selected bank to a global I/O bus G-I/O and, in a writing operation, supplying the write data transmitted via the bus G-I/O to a corresponding bank; a data input/output circuit 1086 for holding the write data supplied from the outside and supplying it to the bus G-I/O in the writing operation, and for holding read data transmitted via the bus G-I/O in the reading operation; and bidirectional input/output buffers 1072 to 1082 for transmitting/receiving the input/output data DQ0 to DQ31 between the data input/output circuit 1086 and the data input/output terminal 1070.

Figure 2:
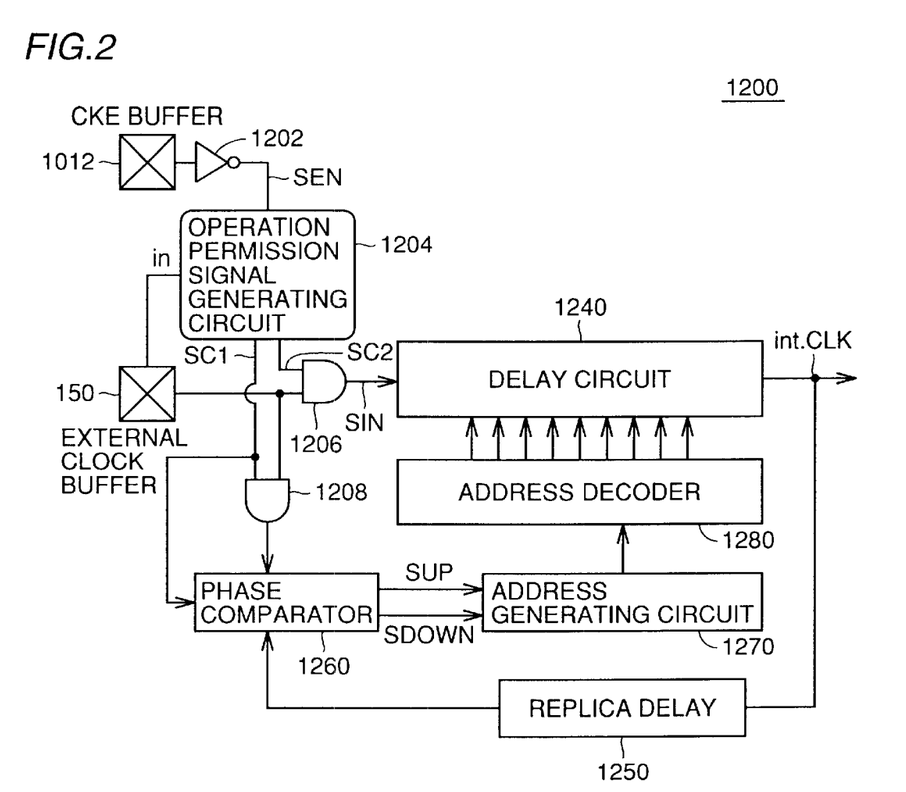
FIG. 2 is a schematic block diagram showing the configuration of an internal clock signal generating circuit 1200 in FIG. 1.

FIG. 2 is a schematic block diagram for explaining the configuration of the internal clock signal generating circuit 1200 shown in FIG. 1.

Referring to FIG. 2, the internal clock signal generating circuit 1200 has: an inverter 1202 for receiving a signal from the CKE buffer 1012, inverting the signal, and outputting the inverted signal as a signal SEN; an operation permission signal generating circuit 1204 which is made operative on receipt of the signal SEN, receives an external clock signal supplied from the external clock buffer 150, and frequency-divides the signal by predetermined cycles to thereby generate control signals SC1 and SC2; an AND gate 1208 for receiving the output signal SC1 from the operation permission signal generating circuit 1204 and an output from the external clock buffer 150 and passing the output from the external clock buffer 150 during a period in which the signal SC1 is active; an AND gate 1206 for receiving the output from the external clock buffer 150 and the signal SC2 and passing the output from the external clock buffer 150 during a period in which the signal SC2 is active; a delay circuit 1240 for receiving an output of the AND gate 1206, delaying the output by predetermined time, and outputting the resultant as an internal clock signal int.CLK; a replica delay circuit 1250 for adjusting the phase difference between the internal clock signal int.CLK and an external clock signal supplied to the external clock buffer 150 to a predetermined amount; a phase comparator 1260 which is made active when the signal SC 1 is activated, for receiving an output of the AND gate circuit 1208 and an output of the replica delay circuit 1250 and comparing the phases of the outputs; an address generating circuit 1270 for receiving an output signal SUP or SDOWN of the phase comparator 1260 and generating a delay control signal to the delay circuit 1240; and an address decoder 1280 for receiving an output of the address generating circuit 1270 and generating a decode signal for controlling the delay amount of the delay circuit 1240.

Figure 3:
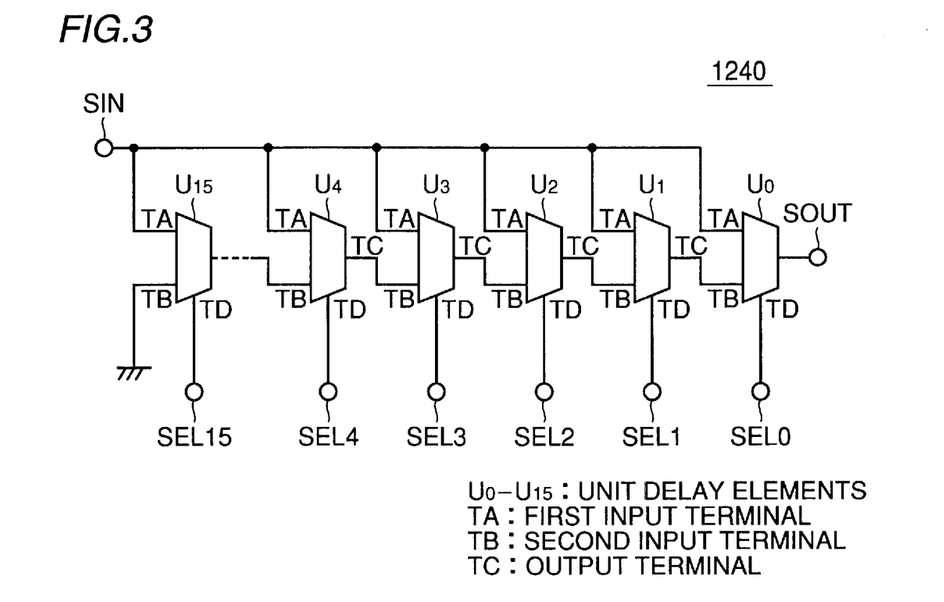
FIG. 3 is a schematic block diagram for explaining the configuration of a delay circuit 1240 shown in FIG. 2.

FIG. 3 is a schematic block diagram for explaining the configuration of the delay circuit 1240 shown in FIG. 2.

Referring to FIG. 3, the delay circuit 1240 has an input terminal SIN, an output terminal SOUT for outputting the internal clock signal int.CLK, and unit delay elements U0 to U15. Each of the unit delay elements U0 to U15 includes a first input terminal TA, a second input terminal TB, an output terminal TC, and a control terminal TD. The control terminals TD of the unit delay elements U0 to U15 are connected to delay selection terminals SEL0 to SEL15 for receiving decode signals sent from the address decoder 1280.

The signal input terminal SIN is commonly connected to the first input terminals TA of the unit delay elements U0 to U15.

The second input terminal TB of the unit delay element U15 is connected to the ground. The output terminal TC of the unit delay element U15 is connected to the second input terminal TB of a unit delay element (not shown) at the next stage.

The terminals are sequentially similarly connected and the output terminal TC of the unit delay element U4 is connected to the second input terminal TB of the unit delay element U3. That is, the unit delay elements U15 to U0 are connected in series, and the output terminal TC of the unit delay element U0 is connected to the output terminal SOUT of the delay line.

In accordance with a decode signal outputted from the address decoder 1280, decode signals supplied to the predetermined number of delay selection terminals SEL0 to SELi among the delay selection terminals SEL0 to SEL15 are made active. In response to this, with respect to the unit delay element in which a signal to be supplied to the control terminal TD becomes active, a path of outputting the signal supplied to the input terminal TB to the terminal TC is selected.

Therefore, the signal supplied from the input terminal SIN to the unit delay element Ui+1 to which the signal SELi+1 is sent is outputted from the terminal TC of the unit delay element Ui+1. The signal is sequentially transmitted to the unit delay elements Ui to U0 and is outputted from the output terminal SOUT. By each of the unit delay elements, the signal is delayed by a unit time td.

In the above operations, by selecting the delay selection terminal according to the delay selection signal, delay time in the delay line can be changed every unit delay time td step by step.

Figure 4:
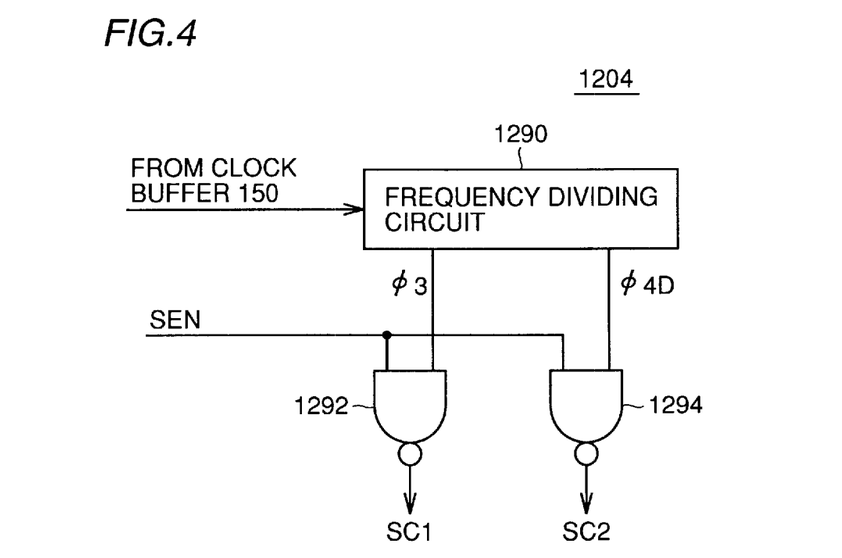
FIG. 4 is a schematic block diagram for explaining the configuration of an operation permission signal generating circuit 1204 shown in FIG. 2.

FIG. 4 is a schematic block diagram for explaining the configuration of the operation permission signal generating circuit 1204 shown in FIG. 2.

A frequency dividing circuit 1290 receives the external clock signal ext.CLK as an output from the external clock buffer circuit and frequency divides the received signal only by $2^3$ cycles and $2^4$ cycles to thereby generate signals φ3 and φ4D, respectively.

An NAND circuit 1292 receives the signal SEN and the signal φ3 and generates the control signal SC1. An NAND circuit 1294 receives the signal SEN and the signal φ4D and generates the control signal SC2.

The operation permission signal generating circuit 1204 operates only in the period in which the clock enable signal CKE is at the "L" level. Both the output signals SC1 and SC2 of the circuit are fixed to the "H" level in the period during which the signal CKE is at the "H" level.

With such a configuration, by the delay locked loop circuit, while suppressing the power consumption of the internal clock signal generating circuit 1200 for generating the internal clock signal int.CLK during the power down mode, even when the control amount for the delay circuit 1240 changes due to a temperature change or voltage change in the power down mode period, a desired internal clock signal int.CLK can be generated immediately after recovery from the power down mode to the normal mode.

Figure 5:
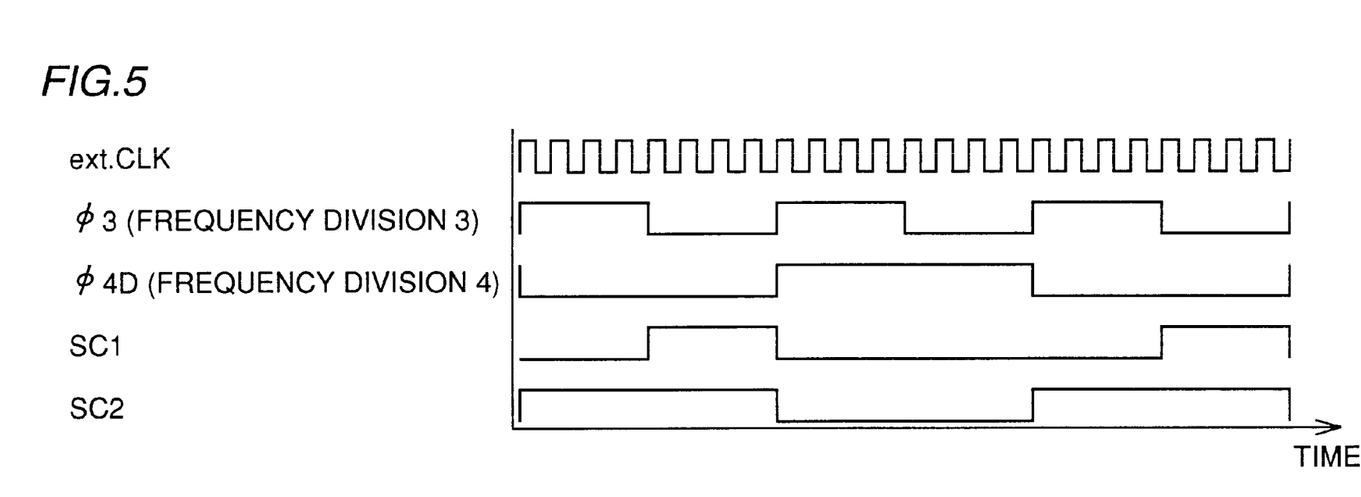
FIG. 5 is a timing chart for explaining the operation of the internal clock signal generating circuit 1200 shown in FIG. 2.

FIG. 5 is a timing chart for explaining the operations of the internal clock signal generating circuit 1200 shown in FIG. 2.

As described above, the external clock signal ext.CLK outputted from the external clock buffer 150 is supplied to the operation permission signal generating circuit 1204, and frequency-divided only by $2^3$ cycles in the operation permission signal generating circuit to thereby generate the signal φ3. The signal φ3 is further frequency-divided, that is, the external clock signal ext.CLK is frequency-divided only by $2^4$ cycles, thereby generating the frequency-divided signal φ4D.

A signal obtained by inverting the three-frequency-divided signal φ3 is outputted as the signal SC1, and a signal obtained by inverting the signal φ4D is outputted as the control signal SC2.

Therefore, the period in which the signal SC2 is active ("H" level) includes the period in which the signal SC1 is active ("H" level).

Only during the signal SC2 is active, the external clock signal is supplied to the delay circuit 1240 via the AND gate circuit 1206.

On the other hand, the phase comparator 1260 is made active only in the period during which the signal SC 1 is active, and the external clock signal is supplied from the external clock buffer 150 to the phase comparator 1260 via the AND gate circuit 1208 only in the period during which the signal SC1 is active.

When the power down mode (CKE="L" level) starts, the phase comparator 1260 therefore stops its operation.

In response to this, the address generating circuit 1270 and the address decoder 1280 also stop their operations. At this time, the address decoder 1280 enters a suspend mode while holding the data of the decode signal indicating the unit delay elements of the number of stages to be made active in the delay circuit 1240. To perform such an operation, it is assumed that the address decoder 1280 is provided with, for example, a latch circuit (not shown) in correspondence with each decode signal.

After that, during the power down mode (CKE="L" level), as shown in FIG. 5, the signals SC1 and SC2 are intermittently made active.

That is, the internal clock signal generating circuit 1200 operates only in the periods in which the signals SC1 and SC2 are active. Consequently, during the period of the power down mode, the internal clock signal generating circuit 1200 updates the decode signal supplied from the address decoder 1280 to the delay circuit 1240 in accordance with a change in the delay amount due to a change in temperature on the outside and a change in voltage.

9

To be specific, when the delay circuit 1240 operates with an accurate delay amount after time of about a few cycles since the recovery from the power down mode to the normal mode, the desired internal clock signal int.CLK is generated from the delay circuit 1240.

Therefore, a reading operation or the like can be performed after short period of time since the recovery from the power down mode to the normal mode.

In the above description, it is assumed that the operation permission signal generating circuit 1204 is active during the period (power down mode) in which the signal CKE is inactive. Alternately, in the standby state during the power down mode period, the operation permission signal generating circuit 1204 can be in an active state.

Second Embodiment

Figure 6:
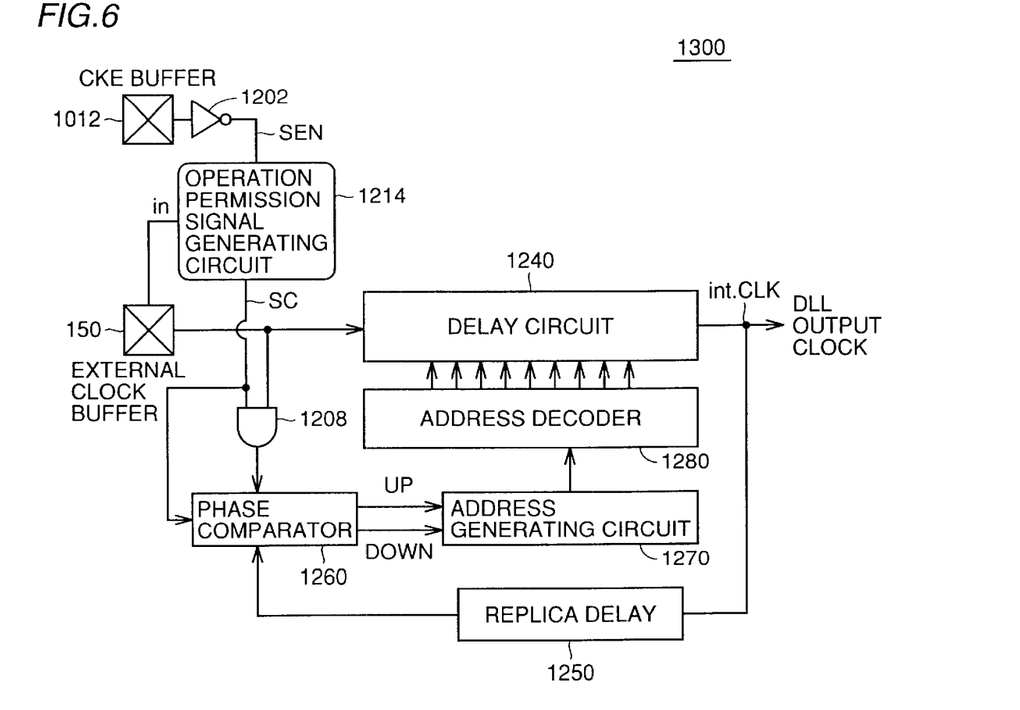
FIG. 6 is a schematic block diagram for explaining the configuration of an internal clock signal generating circuit 1300 in a second embodiment of the invention.

FIG. 6 is a schematic block diagram for explaining the configuration of an internal clock signal generating circuit 1300 according to a second embodiment of the invention and is a diagram compared with FIG. 2 of the first embodiment.

The point in which the configuration of the internal clock signal generating circuit 1300 of the second embodiment shown in FIG. 6 is different from that of the internal clock signal generating circuit 1200 of the first embodiment is as follows.

In the internal clock signal generating circuit 1300, an operation permission signal generating circuit 1214 is provided in place of the operation permission signal generating circuit 1204. The operation permission signal generating circuit 1214 is made active by the output signal SEN of the inverter 1202 for inverting the output of the CKE buffer 1012, receives the external clock signal ext.CLK from the external clock buffer 150, and frequency-divides the external clock signal ext.CLK by predetermined cycles as will be described hereinlater, thereby generating the control signal SC. An output from the external clock buffer 150 is directly supplied to the delay circuit 1240.

The output from the external clock buffer 150 is supplied to the phase comparator 1260 via the AND circuit 1208 which receives the control signal SC by one of its input nodes and receives the output of the external clock buffer 150 by the other input node. The phase comparator 1260 is made active by the control signal SC.

The other configuration is similar to that of the internal clock signal generating circuit 1200 shown in FIG. 2. The same components are designated by the same reference numerals and their description will not be repeated.

It is assumed that the delay amount of the replica delay circuit 1250 is set so as to compensate a phase delay caused by the external clock buffer 150 and the AND circuit 1208.

Figure 7:
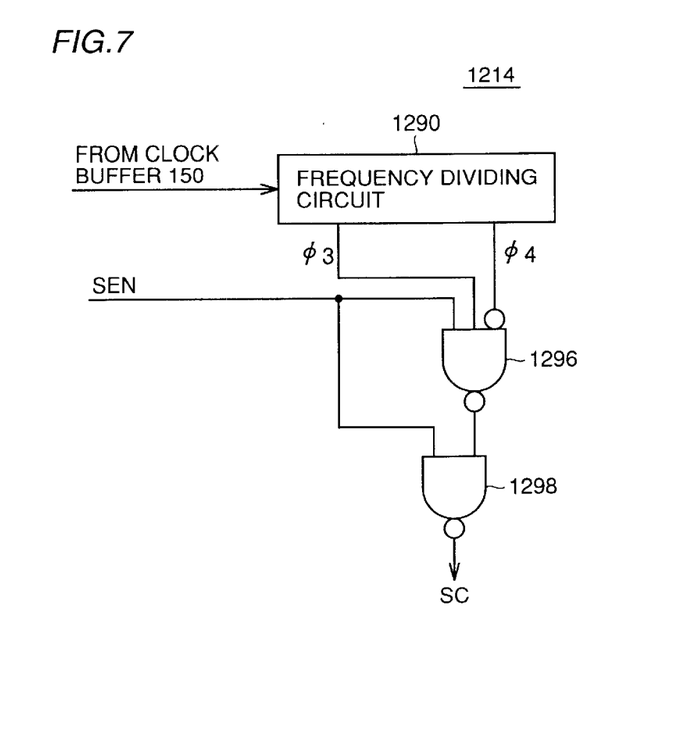
FIG. 7 is a schematic block diagram for explaining the configuration of an operation permission signal generating circuit 1214 shown in FIG. 6.

FIG. 7 is a schematic block diagram for explaining the configuration of the operation permission signal generating circuit 1214 shown in FIG. 6.

The frequency dividing circuit 1290 receives an output from the external clock buffer circuit, frequency-divides the output only by $2^3$ cycles to thereby generate the signal φ3 and further frequency-divides the signal φ3 to thereby generate the frequency divided signal φ4 which is obtained by dividing the external clock signal ext.CLK only by $2^4$ cycles.

A three-input logic gate circuit 1296 receives the signal SEN, signal φ3, and an inversion signal of the signal φ4, performs a NOT-AND operation on them, and outputs the result.

An NAND circuit 1298 receives the output of the logic gate circuit 1296 and the signal SEN and generates the control signal SC.

The operation permission signal generating circuit 1214 operates only in the period during which the clock enable signal CKE is at the "L" level. The output signal SC is fixed to the "H" level during the signal CKE is at the "H" level.

With such a configuration, by the delay locked loop circuit, while suppressing the power consumption of the internal clock signal generating circuit 1300 for generating the internal clock signal int.CLK during the power down mode, even when the control amount for the delay circuit 1240 changes due to a temperature change or voltage change in the power down mode period, a desired internal clock signal int.CLK can be generated immediately after recovery from the power down mode to the normal mode.

Figure 8:
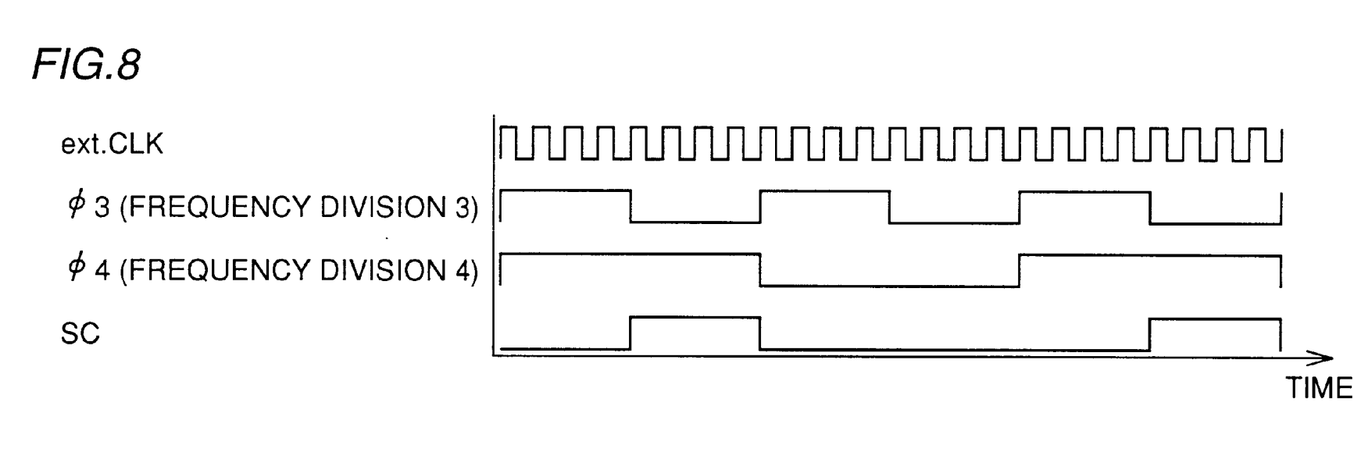
FIG. 8 is a timing chart for explaining the operation of the operation permission signal generating circuit 1214 shown in FIG. 6.

FIG. 8 is a timing chart for explaining the operations of the operation permission signal generating circuit 1214 shown in FIG. 6.

The external clock signal ext.CLK supplied from the external clock buffer 150 is frequency-divided only by 23 cycles to thereby generate the signal φ3. The signal φ3 is further frequency-divided, thereby generating the frequency divided signal φ4D which corresponds to a signal obtained by dividing the external clock signal ext.CLK by 24 cycles. The control signal SC which becomes active only in the period during which the signal φ3 is at the "L" level and the signal φ4 is at the "H" level is outputted from the operation permission signal generating circuit 1214.

By the signal SC generated from the operation permission signal generating circuit 1214, only during the period in which the signal SC is active (period of "H" level), the phase comparator 1260 is made active and the external clock signal ext.CLK is supplied to the phase comparator 1260. When the phase comparator 1260 stops, the address generating circuit 1270 and the address decoder 1280 following the phase comparator also stop operating. The address decoder 1280 holds the decode signal level just before the operation stops.

The operation permission signal generating circuit 1214 operates only in the period during which the signal CKE is at the "L" level. In the period during which the signal CKE is at the "H" level, the signal SC is fixed at the "H" level.

With the configuration as well, while suppressing the power consumption during the power down mode period, a temperature change or voltage change which occurs during the power down mode period is absorbed, and the desired internal clock signal int.CLK can be generated in short period of time after recovery to the normal mode.

In the second embodiment as well, it is assumed that the operation permission signal generating circuit 1214 is active in the period (power down mode) during which the signal CKE is inactive. Alternately, in the standby state in the power down mode period, the operation permission signal generating circuit 1214 can be in an active state.

Third Embodiment

Figure 9:
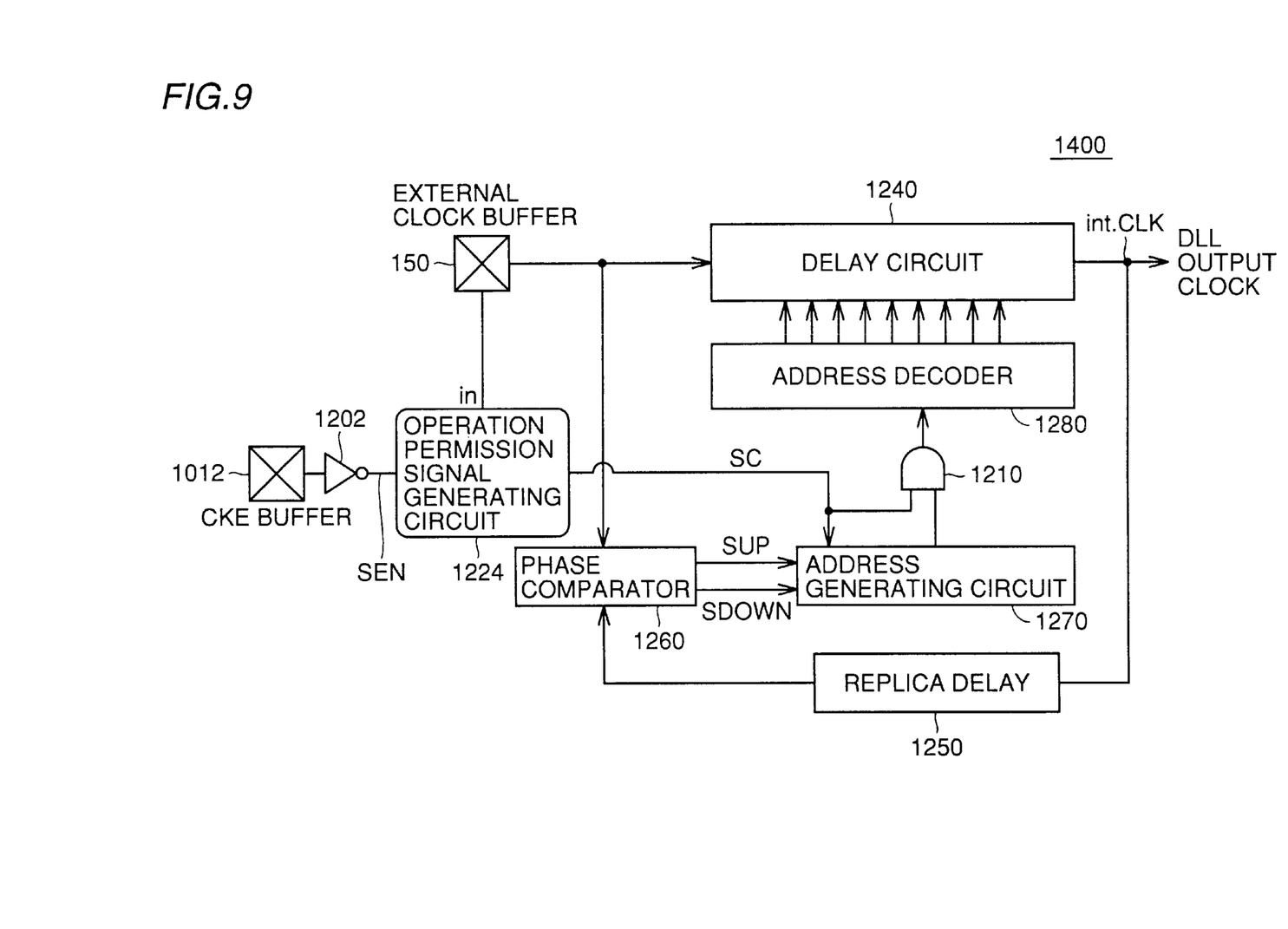
FIG. 9 is a schematic block diagram for explaining the configuration of an internal clock signal generating circuit 1400 in a third embodiment of the invention.

FIG. 9 is a schematic block diagram for explaining the configuration of an internal clock signal generating circuit 1400 of a third embodiment of the invention.

The point in which the configuration of the internal clock signal generating circuit 1400 is different from that of the internal clock signal generating circuit 1200 of the first embodiment is as follows.

The external clock signal ext.CLK outputted from the external clock buffer 150 is directly supplied to the delay circuit 1240 and the phase comparator 1260.

In the internal clock signal generating circuit 1400, an operation permission signal generating circuit 1224 is provided in place of the operation permission signal generating circuit 1204. The operation permission signal generating circuit 1224 is made active in response to an output signal of the inverter 1202 which receives a signal outputted from the CKE buffer 1012 and inverting the signal and, in a manner similar to FIG. 8, generates the signal SC which is made active only in the period during which the signal $\phi 3$ is at the "L" level and the signal $\phi 4$ is at the "H" level.

The address generating circuit 1270 is made active by the signal SC and operates only in the active period of the signal SC. On the other hand, the output from the address generating circuit 1270 is supplied to one of input nodes of the AND gate circuit 1210 and the signal SC is supplied to the other input node of the AND gate circuit 1210. An output of the AND gate circuit 1210 is supplied to the address decoder 1280.

Only in the period during which the signal SC is active, an output of the address generating circuit 1270 is supplied to the address decoder 1280.

In FIG. 9, only the signal of one bit in the signal outputted from the address generating circuit 1270 is shown as a representative. In the practice configuration of the internal clock signal generating circuit 1400, signals of a plurality of bits are outputted in parallel from the address generating circuit 1270 and a signal corresponding to each of the bits is supplied to the address decoder 1280 via a gate circuit corresponding to the AND circuit 1210.

That is, in the internal clock signal generating circuit 1400 of the third embodiment, the signal SC generated by the operation permission signal generating circuit 1224 is used, only in the period during which the signal SC is active, the address generating circuit 1270 is made active and the address signal is supplied to the address decoder 1280.

The operation permission signal generating circuit 1224 operates only in the period during which the signal CKE is at the "L" level. In the period during which the signal CKE is at the "H" level, the signal SC is fixed at the "H" level.

With the configuration as described above, while suppressing the power consumption during the power down mode period, an influence of a temperature change or voltage change which occurs during the power down mode period is absorbed, and the desired internal clock signal int.CLK can be generated in relatively short time after recovery from the power down mode to the normal mode.

In the third embodiment as well, it is assumed that the operation permission signal generating circuit 1224 is active in the period (power down mode) during which the signal CKE is inactive. Alternately, in a standby state in the power down mode period, the operation permission signal generating circuit 1224 can be in an active state.

Fourth Embodiment

Figure 10:
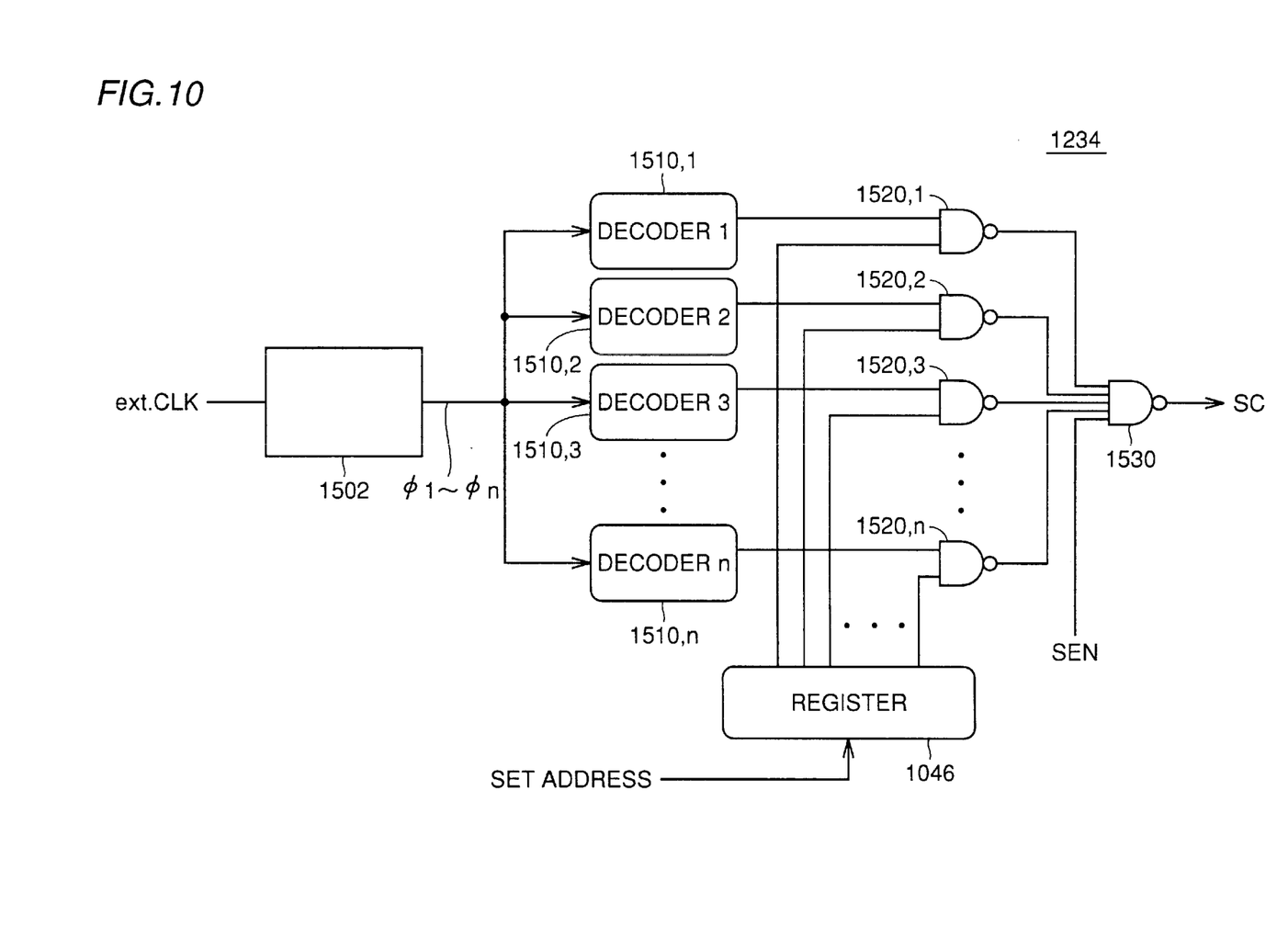
FIG. 10 is a schematic block diagram for explaining the configuration of an operation permission signal generating circuit 1234.

FIG. 10 is a schematic block diagram for explaining the configuration of an operation permission signal generating circuit 1234 as another configuration of the operation permission signal generating circuits 1214 and 1224 in the internal clock signal generating circuits 1300 and 1400 shown in FIGS. 6 and 9, respectively.

The operation permission signal generating circuit 1234 includes: a frequency divided clock generating circuit 1502 for receiving the external clock signal ext.CLK from the external clock buffer 150 and frequency-dividing the signal only by $2^1$ to $2^n$ (n: natural number) to generate signals $\phi 1$ to $\phi n$; decoders 1510.1 to 1510.n for receiving outputs from the frequency divided clock generating circuit 1502 and outputting a result of decoding by a predetermined arithmetic process; NAND circuits 1520.1 to 1520.n each for receiving an output from the register 1046 of which output is set according to a predetermined combination of the address signals A0 to Ai supplied from the outside by one of its input nodes and receiving an output from a corresponding one of the decoders 1510.1 to 1510.n by the other input node; and an (n+1)-input NAND circuit 1530 for receiving outputs of the NAND circuits 1520.1 to 1520.n and the output signal SEN of the inverter 1202 which inverts an output of the CKE buffer 1012 by its input nodes and outputting the signal SEN.

It is sufficient that the decoding process performed by the decoders 1510.1 to 1510.n is a logical operation which can make the signal SC intermittently active according to a combination of signals $\phi 1$ to $\phi n$. As an example, neither-nor operation between the signals $\phi 3$ and $\phi 4D$ may be performed.

Figure 11:
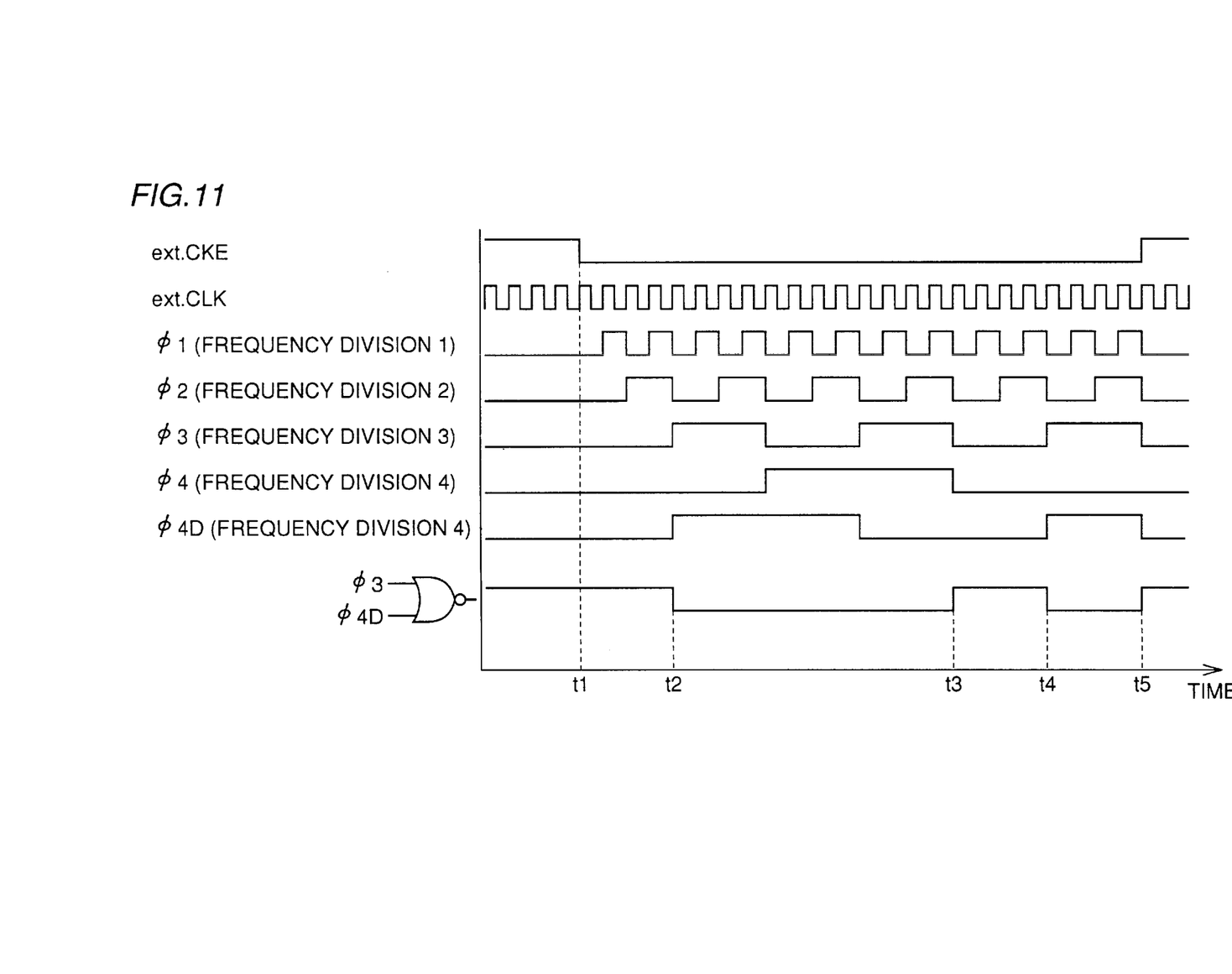
FIG. 11 is a timing chart for explaining the operation of the operation permission signal generating circuit 1234 shown in FIG. 10.

FIG. 11 is a timing chart for explaining the operations of the operation permission signal generating circuit 1234 shown in FIG. 10.

At time t1, when the signal ext.CKE rises to the "H" level, the signal SEN rises to the "H" level. In response to this, the frequency divided clock generating circuit 1502 is made active, divides the external clock signal ext.CLK by $2^1$ cycles, $2^2$ cycles, $2^3$ cycles, and $2^4$ cycles to thereby generate signals $\phi 1$, $\phi 2$, $\phi 3$, and $\phi 4$, and divides the external clock signal ext.CLK by $2^4$ cycles to thereby generate a signal $\phi 4D$ which becomes active at a timing different from a timing the signal $\phi 4$ becomes active.

At the trailing edge of the signal $\phi 1$ (transition from the "H" level to the "L" level), the signal $\phi 2$ becomes active. At the trailing edge of the signal $\phi 2$, the signal $\phi 3$ becomes active. At the trailing edge of the signal $\phi 3$, the signal $\phi 4$ becomes active.

Meanwhile, as a signal which becomes active at the rising edge of the signal $\phi 3$ (transition from the "L" level to the "H" level) and is obtained by frequency-dividing the external clock signal by $2^4$ cycles, the signal $\phi 4D$ is generated.

When the decoder 1510.1 is, for example, a decoder for receiving the signals $\phi 43$ and $\phi 4D$, performing an neither-nor operation, and outputting the resultant signal, at time t2, as the signals $\phi 3$ and $\phi 4D$ rise, the output level of the decoder 1510.1 becomes the "L" level.

At time t3, the signals $\phi 3$ and $\phi 4D$ go down to the "L" level. In response to this, the output level of the decoder 1510.1 changes to the "H" level.

At time t4, as the signal $\phi 4D$ rises again to the "H" level, the output level of the decoder 1510.1 becomes the "L" level.

At time t5, as the signal ext.CKE goes up to the "H" level, the signal SEN goes down to the "L" level. Meanwhile, at time t5, as both the signals $\phi 3$ and $\phi 4D$ go down to the "L" level, the output level of the decoder 1510.1 becomes the "H" level.

From the time t5 on, the level of the signal SC outputted from the NAND circuit 1530 is fixed to the "H" level irrespective of the output levels of the decoders 1510.1 to 1510.n.

It is assumed that each of the decoders 1510.2 to 1510.n receives the frequency divided clocks $\phi 1$ to $\phi n$ and a signal which intermittently rises to the "H" level is generated by a predetermined logical operation.

With such a configuration, by setting the value of the register 1046 in accordance with a combination of the address signals A0 to Ai supplied from the outside, intermittent pulses optimum for a use state can be selected.

Thus, while suppressing the power consumption in the power down mode to an optimum value, changes in outside temperature and power supply voltage are absorbed and a desired internal clock signal int.CLK can be generated in relatively short time after recovery from the power down mode to the normal mode.

For example, the period of intermittently operating the internal clock signal generating circuit can be made long under the operating environment in which a fluctuation of the outside temperature is relatively large, and the intermittent operation period can be set to be short under the operation environment in which the outside temperature is relatively stable.

Moreover, the intermittent operation period can be set from the outside of the chip even after the chip on which the semiconductor storage device is mounted is assembled in a package and is sealed.

In the operation permission signal generating circuit 1204 in the first embodiment as well, by providing the configuration as shown in FIG. 10, in correspondence with the control signals SC1 and SC2, the period in which each of the signals SC1 and SC2 becomes intermittently active can be changed according to the setting from the outside.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor storage device which performs a synchronous operation on the basis of an external clock signal, including:
   a storage circuit for holding storage data;
   a clock control signal generating circuit for generating an internal control signal which is intermittently active in suspension mode in which data transmitting/receiving operations between said storage circuit and the outside of said semiconductor storage device are suspended according to a control signal from the outside, and which is active in normal mode; and
   an internal clock signal generating circuit which is made active by said internal control signal, receives said external clock signal, and generates an internal clock signal for controlling data transmitting/receiving operations to/from said storage circuit.

2. The semiconductor storage device according to claim 1, wherein said internal clock signal generating circuit includes:
   a delay circuit for receiving said external clock signal and delaying the external clock signal by a variable delay amount to generate said internal clock signal,
   said delay circuit having a plurality of unit delay elements each of which is made active in correspondence with said delay amount and which are connected in series;
   a phase comparing circuit which is made active by said internal control signal from said clock control signal generating circuit, receives said external clock signal and an output from said delay circuit, and compares phases of said external clock signal and the output;
   a delay control circuit for receiving a comparison result of said phase comparing circuit and generating a delay amount control signal for controlling said delay amount; and
   a decoding circuit for receiving an output of said delay circuit and generating a decode signal for selectively activating said plurality of unit delay elements.

3. The semiconductor storage device according to claim 2, wherein said internal clock signal generating circuit further includes
   a first gate circuit for supplying said external clock signal to said phase comparing circuit in accordance with the internal control signal from said clock control signal generating circuit.

4. The semiconductor storage device according to claim 3, wherein said internal clock signal generating circuit further includes
   a second gate circuit for supplying said external clock signal to said delay circuit in accordance with the internal control signal from said clock control signal generating circuit.

5. The semiconductor storage device according to claim 4, wherein said clock control signal generating circuit includes:
   a frequency dividing circuit for receiving said external clock signal and frequency-dividing said external clock signal by predetermined cycles to thereby generate a plurality of frequency divided signals;
   a plurality of logic circuits each for receiving a predetermined combination of said plurality of frequency divided signals and performing a predetermined logic operation; and
   a selecting circuit for generating said internal control signal from an output of a logic circuit selected from said plurality of logic circuits in accordance with setting of a control signal from the outside.

6. The semiconductor storage device according to claim 1, wherein said internal clock signal generating circuit further includes:
   a delay circuit for receiving said external clock signal and delaying said external clock signal by a variable delay amount to generate said internal clock signal,
   said delay circuit having a plurality of unit delay elements connected in series, each of which is made active in correspondence with said delay amount;
   a phase comparing circuit for receiving said external clock signal and an output from said delay circuit, and compares phases of said external clock signal and the output;
   a delay control circuit which is made active in accordance with an internal control signal from said clock control signal generating circuit, receives a comparison result of said phase comparing circuit, and generates a delay amount control signal for controlling said delay amount;
   a decoding circuit for receiving an output of said delay circuit and generating a decode signal for selectively activating said plurality of unit delay elements; and
   a gate circuit for supplying said delay amount control signal to said decoding circuit in accordance with an internal control signal from said clock control signal generating circuit.

7. The semiconductor storage device according to claim 6, wherein said clock control signal generating circuit includes:
   a frequency dividing circuit for receiving said external clock signal and frequency dividing said external clock signal by predetermined cycles to thereby generate a plurality of frequency divided signals;
   a plurality of logic circuits each for receiving a predetermined combination of said plurality of frequency divided signals and performing a predetermined logic operation; and a selecting circuit for generating said internal control signal from an output of a logic circuit selected from said plurality of logic circuits in accordance with setting of a control signal from the outside.

8. The semiconductor storage device according to claim 1, wherein said clock control signal generating circuit includes:

a frequency dividing circuit for receiving said external clock signal and dividing said external clock signal by predetermined cycles to thereby generate at least two frequency divided signals; and a logic circuit for receiving said frequency divided signal and performing a predetermined logic operation to thereby generate said internal control signal.

9. The semiconductor storage device according to claim 8, wherein said clock control signal generating circuit includes:

a frequency dividing circuit for receiving said external clock signal and frequency dividing said external clock signal by predetermined cycles to thereby generate a plurality of frequency divided signals;

a plurality of logic circuits each for receiving a predetermined combination of said plurality of frequency divided signals and performing a predetermined logic operation; and a selecting circuit for generating said internal control signal from an output of a logic circuit selected from said plurality of logic circuits in accordance with setting of a control signal from the outside.

\* \* \* \* \*